July 21, 1970  KAZUO TOYA  3,521,600
AUTOMATIC MEASUREMENT AND CONTROL OF WEIGHT UNIFORMITY OF
TRAVELING SHEET MATERIAL
Filed March 14, 1968  3 Sheets-Sheet 1

INVENTOR.
Kazuo Toya
BY George B. Oiseroll
Attorney

FIG. 6(a)　$M_1+M_2=W$
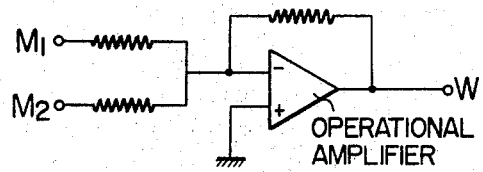
FIG. 6(b)　$M_1 + \dfrac{2M+c-L}{2L} W = M_1'$
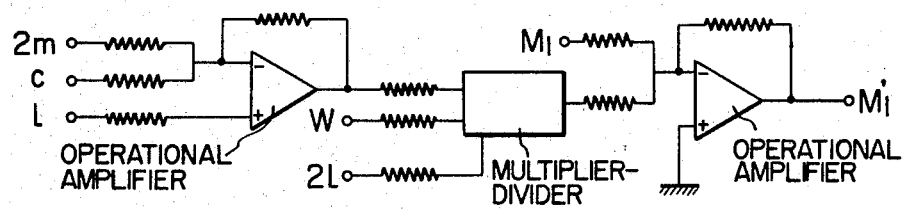
FIG. 6(c)　$\dfrac{W}{2} - \dfrac{3L}{2c}\left(\dfrac{W}{2} - M_1'\right) = W_1$
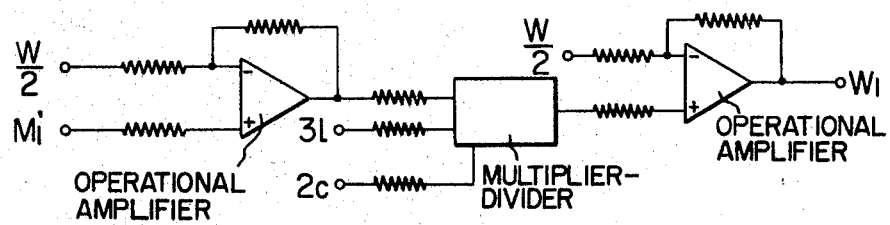
FIG. 6(d)　$W - W_1 = W_2$
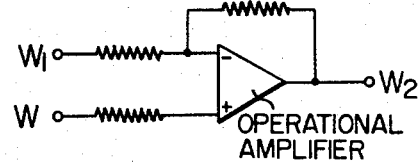
FIG. 7
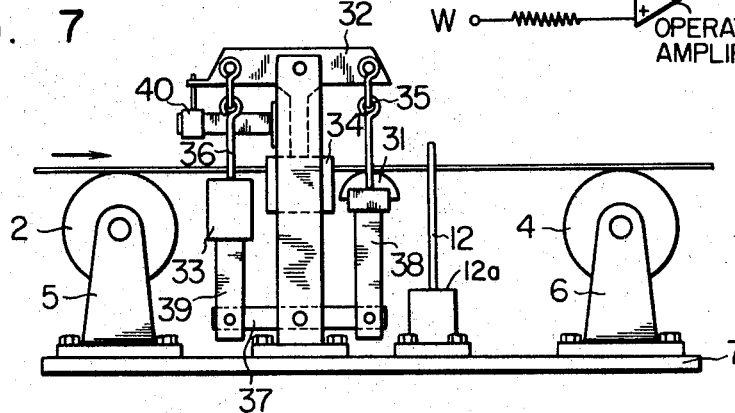
INVENTOR.
Kazuo Toya
BY George B. Oujevolk
Attorney

United States Patent Office 3,521,600
Patented July 21, 1970

3,521,600
AUTOMATIC MEASUREMENT AND CONTROL OF WEIGHT UNIFORMITY OF TRAVELING SHEET MATERIAL
Kazuo Toya, 143 3-chome, Kugayama, Suginami-ku, Tokyo-to, Japan
Filed Mar. 14, 1968, Ser. No. 713,229
Claims priority, application Japan, July 20, 1967, 42/46,339
Int. Cl. B05c 11/02
U.S. Cl. 118—8
8 Claims

ABSTRACT OF THE DISCLOSURE

A long sheet material traveling in a production line is supported on three spaced apart, transverse rollers, the middle measuring roller transmitting the weight load imposed on it by the sheet material to force-detecting devices at its ends, which devices convert the detected forces into electrical quantities from which the weight and weight uniformity of the sheet material are determined and indicated or compared with predetermined standard values. Deviations cause one or more control devices to control process variables in the line governing the weight so as to maintain the weight constant and uniform in the longitudinal and lateral directions of the sheet material.

BACKGROUND OF THE INVENTION

This invention relates generally to the field of production or processing of long, relatively wide sheet material (hereinafter referred to as "sheet material" or "sheet"), to techniques in measuring the weight and weight uniformity of such sheet material traveling continuously in the longitudinal direction thereof in a production line, and to techniques in automatically controlling the weight and weight uniformity on the basis of the measurements thus made. It is to be understood that the term "weight" used herein means weight-per-unit-area.

Examples of sheet material with which the invention is concerned are films, sheets, and fabrics of materials such as papers, metals, non-metallic substances, organic substances, and synthetic resins.

In general, the weight (per unit area) of such a sheet material is determined at a specified constant value and, moreover, must be uniform over the entire length and entire width of the sheet material. When a sheet material is subjected to a process such as impregnation or coating with another substance, the weight of the substance thus added must be constant, and the distribution of this weight must also be uniform. Since these sheet materials are ordinarily manufactured or processed continuously with open width, it is highly important in such a process to carry out constant measurement and control of the weight per unit area and evenness thereof of the material.

Furthermore, in dyeing and other treatment of materials such as fabrics, fiber webs, and warp yarns, there is not much variation in the weight as a result of the treatment. During each treatment, however, there are frequent repetitions of saturating, liquid removal (as by squeezing), and drying of the process agent such as a dye or a chemical, and since the dye or chemical is ordinarily added to the process liquid with a constant concentration, the quantity of the dye or chemical applied is determined by the moisture content of the sheet after liquid removal and drying. This quantity of the dye or chemical applied influences the quality of the product after treatment. Accordingly, the measurement and control of the moisture content and the uniformity of the distribution thereof is highly important.

In addition to maintaining the specified weights and product quality, instrumentation is directly related to increase in productivity by increasing work efficiency and affording savings in materials and labor and is becoming of ever increasing importance with the trend particularly toward continuous and automatized production systems and speed-ups in the production process.

According to ordinary practice, rolling mills, calenders, and the like are used for the production of foils, films, and sheets of metals and other materials; padders and coaters are used for impregnation and coating of various materials; and mangles and squeeze rolls are used for removing liquids after application of the liquids in process such as paper making and fabric dyeing. The principal parts of these devices are invariably press or squeeze rolls, which are most important in determining the weights and weight uniformities of their respective sheet materials.

In general, press rolls receive their working pressure forces through forces applied at their opposite ends, and the performance of the rolls themselves and the adjustment of the applied forces have a great effect on the compressing result. Even in the case where press rolls of normal performance are used, it is difficult to obtain fully satisfactory results with the adjustment method as generally practiced at present wherein the magnitude of the forces applied on the opposite ends of the rolls is taken as a criterion.

However, even when the forces on the opposite sides of such a press roll of normal performance are unbalanced, unevenness in the width direction exhibits a linear variation, which may be considered as a kind of weight gradient. This is a point which should be noted in considering measuring devices related to rolls of this character.

While electrical micrometers, electron beam micrometers, and X-ray micrometers are sometimes used in place of weight measuring devices in manufacturing or processing, it is difficult to apply these micrometers to all fields. Furthermore, while electrical moisture meters and electromagnetic wave moisture meters have been tried for measuring moisture contents of sheet materials in processes such as paper making and fabric dyeing, the use of these meters has been difficult in general practice because of troublesome procedures which are required such as the necessity in the case of fabric dyeing, in which the kind of fiber, fabric density, compositions of the chemical liquids, and other factors vary at each instance of application, of correcting the measured results according to the variables and because these meters in many cases are limited in use to local or spot measurements.

Thus, it has been difficult heretofore to accomplish readily and accurately automatic measurement and automatic control of weights and weight uniformities of sheet materials during manufacture or processing thereof.

SUMMARY OF THE INVENTION

It is an object of the present invention to overcome the above described difficulties and to provide a device and system of relatively simple and inexpensive organization for accurately and automatically measuring and controlling the weights and weight uniformities of sheet materials traveling in a production line.

According to the present invention, briefly summarized, there is provided an automatic weight measuring device in which three spaced apart parallel members are disposed below and transversely across a sheet material traveling horizontally in a production line to contact and support the same, the middle member being a measuring member transmitting the weight of the sheet material imposed thereon to load-detecting means coupled to the ends of the member, and, in response to the loads thus detected, indicating means determine and indicate the weights respectively of the two lateral halves of the sheet material and the sum thereof.

The present invention, in another aspect thereof, further provides an automatic weight control system including the above described weight measuring device and further having control means operating on the basis of the weights of the lateral halves of the sheet material and the sum thereof thus determined to impart corrective control over at least one process variable in the production line with respect to any deviation of the weights and their sum from respective predetermined values thereof thereby to maintain constant the weight and weight uniformity of the sheet material.

BRIEF DESCRIPTION OF THE DRAWINGS

The nature, principle, details, and utility of the invention will be more clearly apparent from the following detailed description with respect to examples of preferred embodiment of the invention when read in conjunction with the accompanying drawings, in which like parts are designated by like reference numerals.

In the drawings:

FIGS. 6(a) through 6(d) are circuit diagrams illustrating examples of computing circuit modules based on analog computation, the operation of each of these circuit elements being as indicated; and FIG. 7 is a side elevational view showing the essential organization of an automatic weight measuring device according to the invention for detecting and measuring extremely small loads.

DETAILED DESCRIPTION

In general, weight or load measuring devices of the instant type can be divided into two broad classifications of method depending on the operational conditions, particularly the properties of the sheet material to be measured, such as the kind, weight (per unit area), thickness, and flexibility (or rigidity). One method, called the deflection method, comprises measuring the deflection of a measuring member produced by a load. The other method, called the zero method (known also as the null method or the balance method), comprises, in principle, restoring by means of a servomechanism a measuring member deflected by a load to its zero-load position and measuring the force required for thus restoring the measuring member. In actual practice, this restoring force is measured as the measuring member is constantly held at the zero-load position.

Figure 1:
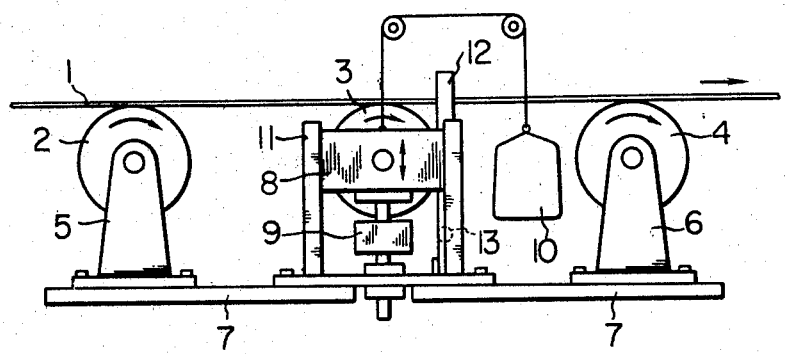
FIG. 1 is a side elevational view showing the essential organization of one example of an automatic weight measuring device embodying the invention and illustrating the principle thereof.
Figure 2:
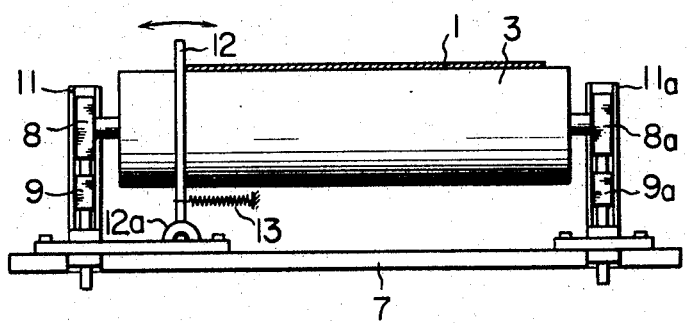
FIG. 2 is an end elevational view, partly in section and with parts removed, showing an essential part of the device shown in FIG. 1.

The principle of the weight detecting mechanism of the invention based on the deflection method is illustrated by the example shown in FIGS. 1 and 2.

In the example of a weight measuring device according to the invention as illustrated in FIGS. 1 and 2, three rollers 2, 3, and 4 are rotatably supported at horizontally spaced apart positions along the path of travel of a sheet material 1 in the longitudinal direction thereof, the axes of rotation of the rollers being mutually parallel and perpendicular to said path of travel, and at vertical positions such that their circumferential peripheries are tangent at their upper parts to a common horizontal plane zero-load under condition.

Of these three rollers, the upstream roller 2 and downstream roller 4 are auxiliary rollers and are rotatably supported on support members 5 and 6 fixedly mounted on a stationary base 7. The roller disposed midway between rollers 2 and 4 is a measuring roller 3 and is rotatably supported at its opposite ends on bearings supported on bearing supports 8 and 8a. These bearing supports 8 and 8a on opposite sides of the roller 3 are coupled at their lower parts respectively to load transducers 9 and 9a and, at the same time, are acted respectively upon by upward forces due to counterweights 10 and 10a (not shown, but provided at side of the members 8a and 9a) for equilibrium of dead weight of measuring roller and load transducer. Furthermore, the bearing supports 8 and 8a are slidably engaged with and vertically guided by guide frames 11 and 11a so that they can undergo minute displacements in response to small external vertical forces.

The sheet material 1 to be measured is traveling in a tensioned state the direction indicated by an arrow in FIG. 1 and in contact with the upper parts of the three rollers 2, 3, and 4, and, therefore, the weight of one half of the material in the distance between the auxiliary rollers 2 and 4 may be considered to be the load applied continually on the measuring roller 3, which accordingly undergoes a minute downward displacement occurring against the restoring springs provided in the transducers. This minute displacement is transmitted through its ends and bearing supports 8 and 8a to the corresponding load transducers 9 and 9a, which convert the displacements respectively received thereby into electrical quantities. Therefore, by subjecting these electrical quantities to an operation and causing the result to be indicated by an indicator, it is possible to measure the weight of the sheet material passing over the measuring apparatus and the uniformity of this weight in the longitudinal direction.

The weight uniformity in the width or transverse direction can be determined by comparing the weights respectively of the left and right halves of the sheet material 1 on opposite sides of the longitudinal centerline thereof. To determine the weights of the left and right halves of the sheet material, the respective displacements of the left and right ends of the measuring roller 3 are measured and subjected separately to operations, and in this case, therefore, it is necessary that the sheet material 1 constantly pass accurately over the center part of the measuring roller 3, that is, with its lateral edges equidistant from the load transducers on their respective sides.

Figure 4:
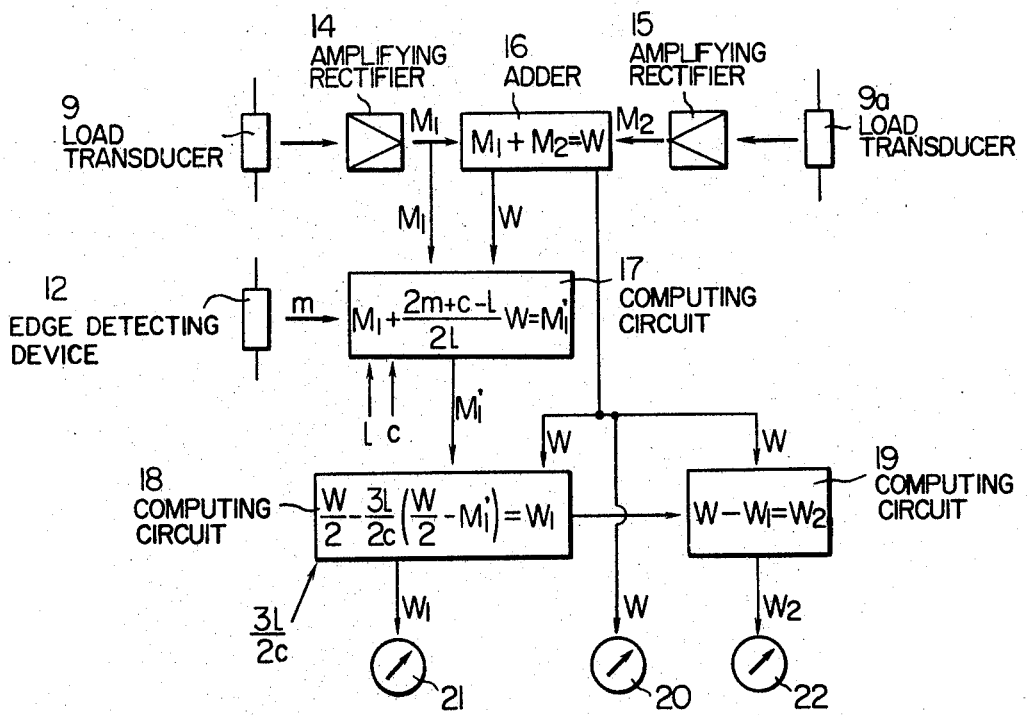
FIG. 4 is a schematic diagram indicating the essential organization of one example of a computing circuit according to the invention.

In the example of the invention as illustrated in FIGS. 1, 2, and 4, even when the sheet material becomes transversely offset from the center part of the measuring roller 3 and becomes displaced toward one lateral side, the sheet material 1 thus displaced is not forcibly returned to its normal center positions, but its displaced position is detected by a device of the following description, correction being made by computation for the difference between this displaced position and the correct center position.

As shown in FIGS. 1 and 2, a feeler 12 for detecting the position of one lateral edge of the sheet material 1 is adapted to be in contact with that edge and to be freely movable in the lateral or width direction and is urged by a spring 13 to follow the lateral movements of the edge. The base of the feeler 12 is fixed to rotary shaft of a potentiometer 12a. This potentiometer has a characteristic of so-called function converting type, in which the moving distance of the feeler is directly taken up as an electric quantity from the rotary angle of the shaft thereof. Accordingly, the potentiometer comprises an edge detecting device together with the feeler 12 and spring 13, wiring of said potentiometer being omitted in FIGS. 1 and 2. Thus, the feeler detects the distance between the lateral edge of the sheet material 1 and the load transducer on that side, and this distance is derived as an electrical quantity. This electrical quantity is used to correct the electrical outputs of the load transducers produced by the offset position of the sheet material 1. To compute the weights of the left and right lateral halves of the sheet material 1 by using the load transducer outputs thus corrected, special calculation equations as derived below are needed.

Figure 3:
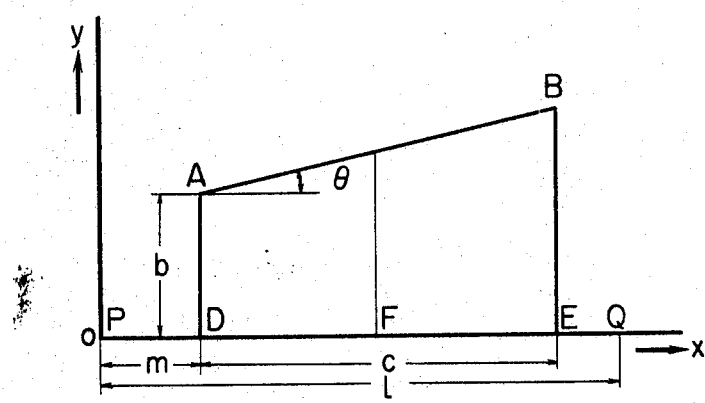
FIG. 3 is a graphical diagram to be referred to in an explanation of a computation equation applied in a computing circuit according to the invention.

Referring to FIG. 3 showing a diagram for explaining these equations, the abscissa or $x$ axis represents lateral distance, and the ordinate or $y$ axis represents weight per unit length in the lateral or $x$ direction. The upper surface of the measuring roller 3 is considered to be coincident with the $x$ axis, and the point of origin P and a point Q on the $x$ axis are assumed to be the load application points of the load transducers 9 and 9a, respectively, the distance between points P and Q being denoted by $l$.

Line DE represents the lateral span of the sheet material 1 traveling over the measuring roller 3 and being measured, and the distance between D and E is denoted by C. It is assumed that line AB represents the lateral distribution of weight per unit length of the sheet material 1, and quadrilateral ABED represents the total weight W of the sheet material 1 acting on the measuring roller 3. This weight W can be divided into two parts by a vertical line through a point F equidistant from points D and E, the part on the side of point P being denoted by $W_1$, and the part on the side of point Q being denoted by $W_2$.

The weight distribution line AB can be represented mathematically in terms of the coordinates $x$ and $y$, the weight gradient $\tan \theta = a$, weight per unit length $AD = b$, and distance $m$ from point P to the edge D of the sheet material by the following equation $$y = ax + b - am$$

The above defined weight part $W_1$ can be represented by the following equation $$W_1 = \frac{W}{1} - \frac{ac^2}{8} \quad (1)$$

If it is assumed that the weight of the measuring roller 3 itself is nullified by the counterweight 10, and only the weight of the sheet material 1 is exerted as loads on the load transducers at points P and Q. The loads at points P and Q will be denoted by $M_1$ and $M_2$, respectively, Then, load $M_1$ may be represented by the following equation $$M_1 = \int_m^{m+c} f(y) \left( \frac{l-x}{l} \right) dx$$

from which $$M_1 = \frac{W}{2} - \frac{2m + c - l}{2l} \cdot W - \frac{ac^3}{12l} \quad (2)$$

When the longitudinal centerline of the sheet material 1 coincides with the lateral centerpoint of the measuring roller 3, $m = (l-c)/2$. Consequently, the second quantity on the right-hand side of Equation 2 becomes zero. That is, $$\frac{2m + c - l}{2l} \cdot W = 0$$

Therefore, by denoting the load at point P when the sheet material 1 is traveling over the center of the measuring roller 3 by $M'_1$, the following equation is obtained $$M_1' = M_1 + \frac{2m + c - l}{2l} \cdot W \quad (3)$$

Since, in Equation 3, $l$ is a constant depending on the measuring apparatus, $c$ is the width of the sheet material and is presumably constant for any one production or processing lot, and W is the sum of $M_1$ and $M_2$, the value of $m$ can be determined. Then, by solving Equation 3, the load value can always be corrected to that when the sheet material 1 is correctly centered, irrespective of the position of the traveling material relative to the measuring roller 3.

From Equations 2 and 3, the following equation is obtained $$M_1' = \frac{W}{2} - \frac{ac^3}{12l} \quad (4)$$

Accordingly, from Equations 1 and 4, the weight $W_1$ of the part of W on the side of point P can be represented by the following equation $$W_1 = \frac{W}{2} - \frac{3l}{2c} \left( \frac{W}{2} - M_1' \right) \quad (5)$$

Since, in the above equation, $3l/2c$ is a constant, and $W/2$ is one half of the sum of $M_1$ and $M_2$, the weight $W_1$ can be computed.

The weight $W_2$ of the part of W on the side of point Q can be obviously represented by $$W_2 = W - W_1 \quad (6)$$

That is, the weight $W_1$ and $W_2$ of the two lateral halves of the sheet material 1 can be determined from the loads exerted by the ends of the measuring roller 3 by Equations 3, 5, and 6.

An example of an electrical circuit for accomplishing computation in accordance with the above derived equations and indicating the results is illustrated in FIG. 4. In this circuit, the electrical output of the load transducer 9 at one end of the measuring roller 3 is amplified and rectified in an amplifying rectifier 14 to become output $M_1$. Similarly, the output of the load transducer 9a at the other end of the measuring roller 3 is amplified and rectified by an amplifying rectifier 15 to become output $M_2$. Outputs $M_1$ and $M_2$ are then added by an adding circuit 16 to produce the sum W as the output.

An operational circuit 17 is provided to compute the value of $M_1'$ from output $m$ of the edge detecting device composed of the detecting device of feeler 12, potentiometer 12a and spring 13 of the amplifying rectifier 14, output W of the adding circuit 16 and preset values of $l$ and $c$. An operational circuit 18 is provided to compute the value of $W_1$ from output $M_1'$ of circuit 17, output W of circuit 16, and preset value of $3l/2c$. A further operational circuit 19 is provided to compute the value of $W_2$ from output $W_1$ of circuit 18 and output W of circuit 16.

Indicators 20, 21, and 22 are provided to indicate respectively the values of W, $W_1$, and $W_2$. Thus, the weight of the travelling sheet material, the weight uniformity in the longitudinal direction, and the weight uniformity in the lateral or material width direction can be determined automatically and simultaneously from the values thus indicated.

FIG. 6 illustrates examples of circuit elements or modules suitable for use in the computing circuit system shown in FIG. 4. By careful selection of each module, computation can be accomplished with ample accuracy.

The outputs W, $W_1$, and $W_2$ can not only be thus indicated but also be transmitted to adjusting means for adjusting, in response to the outputs thus transmitted, the process variables which determine the weight and weight uniformity of the sheet material. Accordingly, a weight detecting device of the above described organization in combination with such adjusting means constitutes a weight control system in accordance with the present invention.

Figure 5:
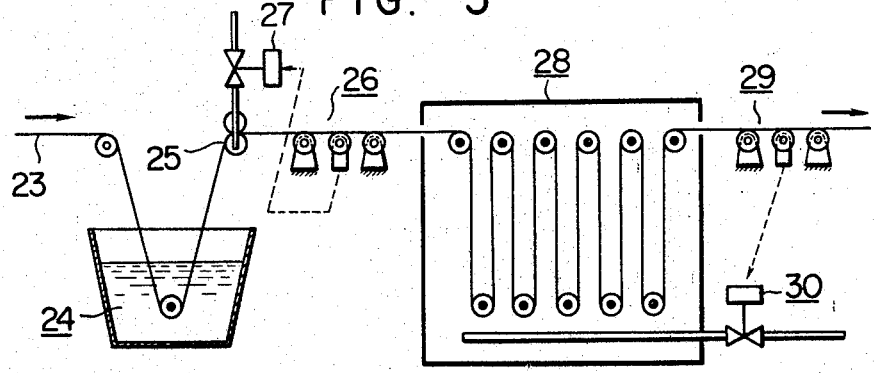
FIG. 5 is a diagrammatic side elevational view indicating one example of application of an automatic control system according to the invention to a fabric processing apparatus.

In one example of such a control system of the invention as illustrated in FIG. 5, the control system is applied to two points in an apparatus for processing a fabric. In this apparatus, a fabric 23 in the form of a sheet material is caused to absorb a chemical liquid in a saturation bath 24, then passes through a mangle (or squeeze rolls) 25, where surplus liquid is removed, passes over a weight detecting device 26 of the invention, passes through a dryer 28, and then passes over another weight detecting device 29 of the invention.

The weight detecting device 26 measures the weight $w$ of the fabric 23 impregnated with the chemical liquid and the weights $w_1$ and $w_2$ of the lateral halves of the fabric, which are received by computing means (not shown) and used in conjunction with the previously measured dry weight $w_0$ of the fabric in the moistureless state to compute as indicated below quantities indicating the liquid content and uniformity thereof of the fabric after it has passed through the mangle 25.

Liquid content of fabric:

$$\alpha = \frac{w - w_0}{w_0} \times 100$$

Liquid contents of lateral halves of fabric:

$$\beta = \frac{w_1 - \frac{w_0}{2}}{\frac{w_0}{2}} \times 100$$

$$\gamma = \frac{w_2 - \frac{w_0}{2}}{\frac{w_0}{2}} \times 100$$

An automatic control device 27 (not shown in detail) for controllably adjusting the forces applied to the two ends of the pressure applying roll of the mangle 25 operates in response to deviations $\lambda - \alpha$, $\lambda - \beta$, and $\lambda - \gamma$ of the liquid contents $\alpha$, $\beta$, and $\gamma$ computed in the above described manner from a predetermined standard liquid content $\lambda$ to make corrective adjustments of the forces applied in the operation of the mangle 25 and thereby to maintain the actual liquid content at the standard value and maintain the uniformity of the liquid content in the lateral direction.

Similarly, another automatic control device 30 operates in response to deviations of moisture contents computed from weight values measured by the weight detecting device 29 from a predetermined standard value of the moisture content of the fabric 23 after the drying step in the dryer 28 to adjust the heat supply to the dryer and thereby to control the dryer temperature and distribution thereof. Thus, the moisture content of the fabric is maintained at the standard value.

The rigidity of the fabric 23 in this case is less than that of a metal sheet or a sheet of an organic material. Accordingly, for a fabric of a width of approximately 1 meter and of ordinary weight per unit area, ample accuracy can be obtained in a device with a working length (half of the distance between the auxiliary rollers 2 and 4) of 30 cm. in the longitudinal direction and a displacement range of the measuring rollers of from 0 to 2 mm. by the apparatus of this system. Therefore, there is no necessity for measurement by the zero method by means of a servomechanism.

Ordinarily, the proportion of dead time in the response delay is large in the adjustment of a mangle, and the control action must be selected with care. For this purpose, a sampling control method wherein the time required for the response with respect to the manipulated variable to be substantially effected is used as a cyclic period, and a follow-up manipulated variable proportional to the deviation at the end of each periodic cycle thereof is imparted is suitable.

Furthermore, since the force on one end of a press roll affects the pressing force on the other end and becomes a disturbance, it is necessary to provide an accessory device for nullifying this force on the side of the final control element.

For the control of the dryer, an ordinary control system can be used since such devices, in general, have large time constants.

When measuring the weight and weight uniformity of very light sheet material as, for example, papers and synthetic resin films, it is necessary to detect extremely light weights and, therefore, to reduce as much as possible the frictional resistances of the moving parts of the weight measuring device. One example of a device for this purpose is illustrated in FIG. 7. The parts of this device which differ from those of the example shown in FIGS. 1 and 2 and indicating the principle of the invention are as follows.

The measuring member between the auxiliary rollers 2 and 4 is in the form of a measuring bar 31 functioning in a manner similar to the aforedescribed measuring roller 3. The measuring bar 31 constitutes a part of a pendulum-type balance comprising, essentially, a centrally pivoted lever or beam 32 having a pendulum 34 integrally fixed thereto, connecting members 35 and 36 pivotally suspended from the ends of the beam 32, the measuring bar 31 connected to the lower end of one connecting member 35, and a counterweight 33 connected to the lower end of the other connecting member 36. The stability of this balance mechanism is maintained by a linkage comprising a centrally pivoted auxiliary beam 37 and connecting links 38 and 39 connected at their upper ends to the bar 31 and counterweight 33 and pivoted connected at their lower ends to the ends of the auxiliary beam 37.

The measuring bar 31 is held by this mechanism at a position midway between the auxiliary rollers 2 and 4 and moreover, at a height such that the upper surface of the bar lies in the same horizontal plane as the uppermost parts of the auxiliary rollers. The measuring bar 31 is thus supported and adapted to undergo a minute downward displacement when a weight load is imposed thereon. Such a minute displacement of the measuring bar 31 is transmitted by way of the beam 32 to a differential type transformer as load transducer 40 having a movable part coupled to one end of the beam 32, whereby a very small load imposed on the measuring bar 31 can be detected and measured.

I claim:

1. In an apparatus in which a sheet material is travelled horizontally in the longitudinal direction thereof, an automatic weight measuring device which comprises: three members which are placed on the same plane at equally spaced positions in the direction perpendicular to the travelling direction of the sheet, the upper surfaces of said members being in contact with the under surface of the sheet, and the center member of said members being a measuring member; guide means for supporting said measuring member at both its ends so as to permit minor and free displacement in the up and down direction; load detecting means provided on the both ends of said measuring member and adapted to detect the load applied to said measuring member as an electrical quantity; edge detecting means provided near one end of said measuring member and adapted to detect the position of one side edge of the sheet passing over said measuring member; computing means connected to said load detecting means and edge detecting means and adapted to compute the electric quantities taken out of said load detecting means and edge detecting means so as to compute the weight of each of two lateral halves of wides of the sheet and their sum; and indicating means indicating these three values.

2. An apparatus as claimed in claim 1 in which there is provided an automatic control means adapted to control the sheet processing device in accordance with the weight of two lateral halves of the sheet and their sum so that weight per unit area of the sheet is made to be coincident with a desired value and weight of the sheet is made to be uniform along the longitudinal direction and width direction thereof.

3. An appaartus as claimed in claim 1, in which there is computing means adapted to compute the water content of the two lateral halves of the width of the sheet and the water content of whole width of the sheet from said three computed values and weight of the sheet material in waterless state and indicating means for indicating the result of said computing means.

4. An automatic weight measuring device for sheet material as claimed in claim 3, in which there is provided additionally, in combination with the other means, an automatic control means adapted to control the sheet processing device in accordance with the computed results of the computing means.

5. An apparatus as claimed in claim 1, in which the support means for supporting the measuring member at its both ends through guide means so as to be moved up and down is replaced by a support means of so-called pendulum type scale, said support means supporting both ends of the measuring member thereby to cause low resistance up and down movement of the measuring member.

6. An apparatus as claimed in claim 5 in which there is provided an automatic control means adapted to control the sheet processing device in accordance with the weight of two lateral halves of the sheet and their sum so that weight per unit area of the sheet is made to be coincident with a desired value and weight of the sheet is made to be uniform along the longitudinal direction and width direction thereof.

7. An apparatus as claimed in claim 5, in which there is computing means adapted to compute the water content of the two lateral halves of the width of the sheet and the water content of whole width of the sheet from said three computed values and weight of the sheet material in waterless state and indicating means for indicating the result of said computing means.

8. An automatic weight measuring device for sheet material as claimed in claim 7, in which there is provided additionally, in combination with the other means, an automatic control means adapted to control the sheet processing device in accordance with the computed results of the computing means.

References Cited

UNITED STATES PATENTS

| | | | |
|---|---|---|---|
| 2,100,653 | 11/1937 | Umansky | 72—9 |
| 2,726,922 | 12/1955 | Merrill et al. | 226—26 X |
| 3,378,676 | 4/1968 | Clement | 118—8 X |

WALTER A. SCHEEL, Primary Examiner

L. G. MACHLIN, Assistant Examiner

U.S. Cl. X.R.

18—2; 68—175; 72—9; 100—47; 134—56; 177—16, 60; 198—39; 226—26